United States Patent Office 3,340,283
Patented Sept. 5, 1967

3,340,283
PREPARATION OF ORGANOTIN-TRIHALIDES
Carl R. Gloskey, Stirling, N.J., assignor to M & T Chemicals Inc., New York, N.Y., a corporation of Delaware
No Drawing. Filed May 20, 1964, Ser. No. 368,982
14 Claims. (Cl. 260—429.7)

This invention relates to a novel process for preparing organotin compounds. More specifically, it relates to a novel technique for the attainment of high yields of organotin products.

It is well known to those skilled-in-the-art that various organotin compounds having the formula $R_aSnX_b$ (wherein the sum of $a$ and $b$ is 4) may be prepared by various reactions including those wherein an alkyl halide RX may be reacted with metallic tin or with certain tin compounds, such as tin tetrahalide. Although these reactions may find a wide commercial use, they are particularly useful when used to produce high yields of compounds $R_4Sn$ and $R_3SnX$. Certain selected reactions of this type may also yield amounts of $R_2SnX_2$ ranging from minimal to low. It is however well known that there is no commercially available technique for the production of $RSnX_3$ compounds in high yields, at moderate cost; and accordingly when such compounds are desired, it is necessary to prepare them indirectly from other organotin compounds or to use methods of preparation which are inordinately expensive and therefore non-commercial.

It is an object of this invention to set forth a novel process for the preparation of organotin compounds. It is a further object of this invention to set forth a novel process particularly characterized by the production in high yield of organotin compounds having the formula $RSnX_3$. Other objects will be apparent to those skilled-in-the-art from inspection of the following description.

In accordance with certain of its aspects, the method of this invention for preparing organotin compounds $RSnX_3$ by the reaction $SnX_2+RX \rightarrow RSnX_3$ wherein R is a hydrocarbon group, Sn is tin, and X is an active halogen may comprise reacting anhydrous $SnX_2$ with RX in the presence of an amine catalyst in a reaction mixture thereby forming $RSnX_3$; maintaining substantially equivalent amounts of $SnX_2$ and RX in said reaction mixture during said reaction; maintaining said reaction mixture at 100°–250° C. and autogenous pressure during said reaction; and separating $RSnX_3$ from said reaction mixture.

In practice of the process of this invention, it may be possible to react $SnX_2$ with RX in the presence of amine catalyst to form $RSnX_3$.

The hydrocarbon halide RX which may be used in the process of this invention may be a compound wherein R may preferably be a hydrocarbon moiety, preferably selected from the group consisting of alkyl, aryl, alkaryl, aralkyl, cycloalkyl, etc. and X may be seen an active halide preferably selected from the group consisting of bromide and chloride. When R is alkyl, it may be methyl, ethyl, n-propyl, i-propyl, n-butyl, i-butyl, sec-butyl, amyl, octyl, decyl, octadecyl, etc. When R is alkaryl, it may typically be tolyl, xylyl, etc. When R is cycloalkyl, it may typically be cyclohexyl, cycloheptyl, methylcyclohexyl, etc. When R is aralkyl, it may typically be benzyl, ω-phenylbutyl, etc. When R is aryl, it may typically be phenyl, naphthyl, etc. The preferred R group may be lower alkyl i.e. alkyl groups having 1–10 carbon atoms. Inertly substituted R groups may be employed.

Illustrative preferred compounds RX which may be used in practice of this invention may include the following chlorides and the corresponding bromides: methyl chloride, ethyl chloride, n-propyl chloride, i-propyl chloride, n-butyl chloride, hexyl chlorides, octyl chlorides, dodecyl chlorides, octadecyl chlorides, tolyl chlorides, xylyl chlorides, cyclohexyl chloride, cycloheptyl chloride, benzyl chloride, ω-phenylethyl chloride, phenyl chloride, etc.

The preferred hydrocarbon halide RX used in the practice of this invention may be n-butyl chloride.

Substantially all of these halide compounds may be liquid at room temperature; and they may typically have boiling points, depending upon the nature of the R group, which may permit maintenance of the reaction mixture in the liquid phase during the reaction.

The compound $SnX_2$ which may be used in the practice of this invention may typically be stannous chloride $SnCl_2$, stannous bromide $SnBr_2$, etc. The preferred compound which may be employed will be stannous chloride. It is preferred that the X in the compound $SnX_2$ be the same as the X in RX; and preferably X will be chlorine.

In practice of this invention the compound $SnX_2$ as used will preferably be anhydrous, i.e. preferably contain less than about 0.1% water.

It is preferred to carry out the reaction using substantially equivalent quantities of $SnX_2$ and RX reactants; however, it may be desirable to use an excess of RX to gain fluidity. Typically the molar ratio of these two components may be 1.0–2.0, and most preferably it will be maintained at about 1—1. Operation in this region may permit attainment of maximum yield of the desired selected product $RSnX_3$.

The catalyst which may be employed in the course of this reaction may be an amine including aliphatic and aromatic primary, secondary, and tertiary amines. Typical amines which may be employed in practice of this invention may be compounds having the formula $R'_3N$ wherein 0–2 R' groups may be hydrogen and at least one of the R' groups may be preferably selected from the group consisting of alkyl, aryl, alkaryl, aralkyl, cycloalkyl, alkenyl, acyl, etc. It will be apparent that two of the R groups may be cyclicized to form amines, the nitrogen atom of which is a component of a ring as e.g. in pyridine. It is also apparent that diamines and polyamines may be employed.

It is preferred that the amine compound which is to be employed as a catalyst in this reaction be one which is liquid at normal ambient temperatures of 20–30° C. and that the amine may be one which may be in liquid phase at the temperature and pressure prevailing in the reaction as hereinafter set forth.

Typical amines which may be employed in the practice of this invention may include: methyl amine, ethyl amine, n-propyl amine, n-butyl amine, i-butyl amine, n-amyl amine, hexyl amine, octyl amine, allyl amine, cyclohexyl amine, benzyl amine, p-toluidine, aniline, p-methyl aniline, ω-phenylethyl amine, ethylene diamine, p-chloro aniline; etc.

Dimethyl amine, diethyl amine, di-n-butyl amine, di-n-amyl amine, dihexyl amine, dioctyl amine, diallyl amine, dicyclohexyl amine, dibenzyl amine, n-methyl ethyl amine, n-methyl aniline, n-ethyl aniline, hexamethylene tetramine, n-methyl naphthylamine; etc.

Trimethyl amine, triethyl amine, tri-n-propyl amine, tri-n-butyl amine, trihexyl amine, triallyl amine, tricyclohexyl amine; etc.

Aniline, p-toluidine, o-toluidine, m-toluidine; etc.

Benzyl amine; etc.

Pyridine, 2-methyl pyridine, 3-methyl pyridine, 2-ethyl pyridine, 3-ethyl pyridine, quinoline, 6-methoxy quinoline, etc., α-picoline, β-picoline, gamma picoline.

Inertly substituted amines including p-chloro aniline, etc. may be employed.

The preferred amines which may be used in practice of this invention may include triethylamine, aniline, pyridine, and n-butylamine.

It will be apparent to those skilled in the art that these amines may be used in the form of a salt with e.g. a hydrocarbon halide such as the alkyl halide RX. Typical of such materials may be aniline hydrochloride; or quaternaries typified by the compound formed e.g. by the reaction of n-butyl amine and n-butyl chloride, i.e., n-butyl ammonium chloride; phenyl methyl ammonium chloride; etc.

In practice of this invention, these amines may be present in the reaction mixture in catalytic amount, typically 0.01–2%, most preferably 0.1–1%, and typically 0.5 mole percent of the amount of $SnX_2$ compound present.

The process of this invention may be carried out by addition to a reaction vessel of the charge compounds $SnX_2$ and RX, together with catalytic amount of amine. In a preferred embodiment of this invention, the reaction may be carried out in the presence of appropriate inert diluent e.g. solvent. It is a feature of this invention that the reaction may be effected very smoothly to give high yields of desired products by use of solvent. Typical diluents or solvents which may be employed may include inert liquids having a boiling point of 75°–250° C. including aliphatic hydrocarbons such as hexane, heptane, octane, etc.; aromatic hydrocarbons such as benzene, toluene, xylene, etc.; cycloaliphatic hydrocarbons such as cyclohexane, cycloheptane, etc. Mixtures of solvents may be used.

The solvent to be employed may preferably be added to the reaction vessel in amount sufficient to establish a substantial excess thereof, whereby the reaction mixture may be substantially entirely liquid phase-containing solid including e.g. $SnX_2$ when this compound may not be soluble in the diluents and reactants. Typically the solvent may be present in amount of 0–100%, say 50–75%, preferably 50% of solvent by weight of total reactants.

Reaction may be effected by heating the reaction mixture typically to temperatures of 100°–250° C., preferably 200°–225° C., say 200° C. In the preferred embodiment of the process of this invention, heating may be carried out under autogenous pressure, i.e. the reaction vessel may be sealed at the beginning of the heating step and pressure generated therein may correspond to that of the reactants and the reaction products. The reaction mixture may be maintained under these conditions for 2–10 hours, typically 4-8 hours, say about 5 hours. It will be apparent to those skilled in the art that the pressure developed will depend upon the vapor pressure of the reaction mixture; and it will also be apparent that the time of reaction may depend upon the pressure and temperature. Higher pressure and temperature may permit the reaction to be carried out in shorter periods of time and vice versa. The reactants may react to give high yields of $RSnX_3$.

At the conclusion of the reaction, the reaction mixture may be cooled to 20°–30° C. and residual unreacted stannous halide $RSnX_2$ may be separated from the reaction mixture as by decantation, filtration, centrifuging, etc.

The reaction mixture may then be distilled to separate volatile hydrocarbon halides RX together with solvent which may be present. In the preferred embodiment, distillation may be carried out up to a temperature of typically slightly above (e.g., 10°–20° C. above) the boiling point of the solvent at the pressure of distillation. This may permit selective removal from the reaction mixture of the solvent and leaves behind an organotin mixture typically containing primarily $RSnX_3$. As will be apparent, the process of this invention permits attainment of high yield of $RSnX_3$ compounds.

Separation of the other organotin components in the reaction mixture may be carried out as desired—typically by distillation, solvent extraction, or other techniques which may be well known to those skilled in the art. Separation e.g. by distillation may also remove any other materials such as residual amounts of RX which may be present in the reaction mixture, at this time; and $SnX_2$ present in the organotin mixture may be recovered as residue if not earlier removed as by filtration.

Practice of this invention may be apparent to those skilled in the art by reference to the following examples wherein all parts are parts by weight unless otherwise specified.

EXAMPLE 1

189.6 parts (1 mole) of anhydrous stannous chloride and 138.9 parts (1.5 moles) of anhydrous normal butyl chloride may be added to a reaction vessel together with 0.46 part (0.005 mole) of aniline catalyst.

The reaction vessel may then be sealed and heated to 200° C. for 5 hours during which time the pressure inside the vessel may be autogenous. At the end of this time, the reaction vessel may be cooled to ambient temperature of 20°–30° C. and the contents removed and filtered to separate any solid material contained therein, the solid being washed with anhydrous butyl chloride, which may then be combined with the filtrate.

The combined filtrate on distillation may yield
 (a) 64 parts of fore-run which may contain 60 parts of butyl chloride, and 4 parts of butyltin trichloride;
 (b) A distillate containing 200 parts of butyltin trichloride boiling at 85°–120° C. at 10 mm. Hg and;
 (c) A residue of 40 parts of stannous chloride.

The yield of butyltin trichloride (Sn: found 40.5%, calc. 42%; Cl: found 37.5%, calc. 38%) may be 70% based upon stannous chloride originally charged to the reaction vessel.

EXAMPLE 2

In this example, the same reactants may be used as for Example 1, except that 150 parts of toluene diluent-solvent may be added to the reaction mixture. After completion of the reaction, the fractions obtained on distillation may be found to be as follows:
 (a) 215 parts of unreacted butyl chloride and toluene containing 4 parts of butyltin trichloride, recovered up to about 150° C.;
 (b) 210 parts of butyltin trichloride recovered at 90°–130° C. at 8 mm. Hg;
 (c) 41 parts of stannous chloride as residue.

The yield of butyltin trichloride may be 75% based on the anhydrous stannous chloride originally charged to the reaction vessel.

EXAMPLE 3

The process of Example 2 may be duplicated except that in place of using aniline as the catalyst, 0.36 part (0.005 mole) of butyl amine may be used as catalyst. There may be recovered from the reaction system 220 parts of butyltin trichloride having a boiling point of 90°–125° C./10 mm. Hg representing a yield of 80% based upon stannous chloride originally charged to the reaction vessel.

Although this invention has been illustrated by reference to specific examples, numerous changes and modifications thereof which clearly fall within the scope of the invention will be apparent to those skilled in the art.

I claim:
1. The method of preparing organotin compounds $RSnX_3$ by the reaction $SnX_2 + RX \rightarrow RSnX_3$ wherein R is a hydrocarbon group, Sn is tin, and X is an active halogen which comprises reacting anhydrous $SnX_2$ with RX in the presence of an amine catalyst in a reaction mixture thereby forming $RSnX_3$; maintaining substantially equivalent amounts of $SnX_2$ and RX in said reaction mixture during said reaction; maintaining said reaction mixture at 100°–250° C. and autogenous pressure during said reaction; and separating from said reaction mixture $RSnX_3$.

2. The method of preparing organotin compounds $RSnX_3$ as claimed in claim 1 wherein R is selected from the group consisting of alkyl, aryl, alkaryl, aralkyl, and cycloalkyl groups.

3. The method of preparing organotin compounds $RSnX_3$ as claimed in claim 1 wherein R is an alkyl group.

4. The method of preparing organotin compounds $RSnX_3$ as claimed in claim 1 wherein R is a lower alkyl group.

5. The method of preparing organotin compounds $RSnX_3$ as claimed in claim 1 wherein X is chlorine.

6. The method of preparing organotin compounds $RSnX_3$ as claimed in claim 1 wherein the amine catalyst is an alkyl amine.

7. The method of preparing organotin compounds $RSnX_3$ as claimed in claim 1 wherein the amine catalyst is selected from the group consisting of triethyl amine, aniline, pyridine, and n-butyl amine.

8. The method of preparing organotin compounds $RSnX_3$ as claimed in claim 1 wherein said amine catalyst is present in said reaction mixture in amount of 0.01–2 mole percent of the amount of $SnX_2$ present.

9. The method of preparing organotin compounds $RSnX_3$ as claimed in claim 1 wherein said amine catalyst is present in said reaction mixture in amount of 0.1–1 mole percent of the amount of $SnX_2$ present.

10. The method of preparing organotin compounds $RSnX_3$ by the reaction $SnX_2 + RX \rightarrow RSnX_3$ wherein R is a hydrocarbon group, Sn is tin, and X is an active halogen which comprises reacting anhydrous $SnX_2$ with RX in the presence of an amine catalyst in a reaction mixture containing inert diluent-solvent thereby forming $RSnX_3$; maintaining substantially equivalent amounts of $SnX_2$ and RX in said reaction mixture during said reaction; maintaining said reaction mixture at 100°–250° C. and autogenous pressure during said reaction; and separating $RSnX_3$ from said reaction mixture $RSnX_3$.

11. The method of preparing organotin compounds $RSnX_3$ as claimed in claim 10 wherein said solvent has a boiling point of 75°–250° C.

12. The method of preparing organotin compounds $RSnX_3$ as claimed in claim 10 wherein said diluent-solvent is a hydrocarbon.

13. The method of preparing organotin compounds $RSnX_3$ as claimed in claim 12 wherein said diluent-solvent is an aliphatic hydrocarbon.

14. The method of preparing butyltin trihalide which comprises reacting anhydrous $SnX_2$ with butyl halide in the presence of an amine catalyst thereby forming butyltin trihalide; maintaining substantially equivalent amounts of $SnX_2$ and butyl halide in said reaction mixture during said reaction; maintaining said reaction mixture at 100°–250° C. and autogenous pressure during said reaction; and separating butyltin trihalide from said reaction mixture.

No references cited.

TOBIAS E. LEVOW, *Primary Examiner*.

W. F. W. BELLAMY, *Examiner*.